Dec. 15, 1970 M. REICH 3,547,548
PHOTOELECTRONIC SWITCHING AMPLIFIER
Filed July 30, 1968
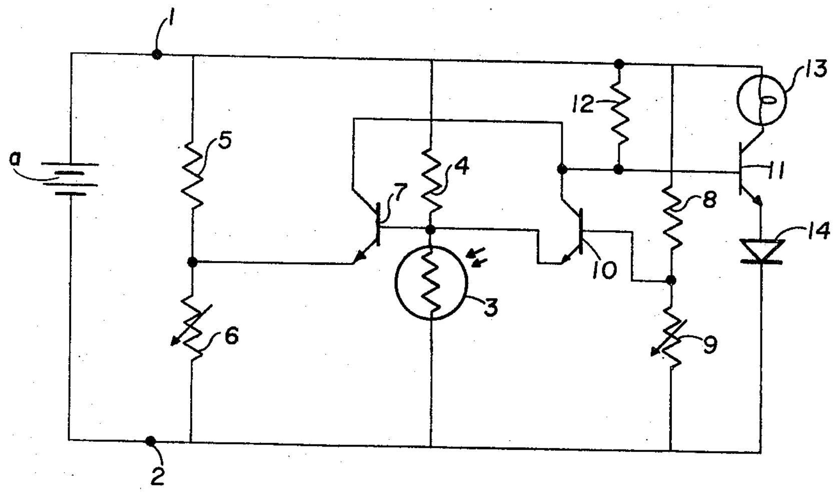
MICHAEL REICH
INVENTOR.
BY Daniel E. Sragow
Robert W. Hampton
ATTORNEYS United States Patent Office 3,547,548

Patented Dec. 15, 1970

3,547,548

PHOTOELECTRONIC SWITCHING AMPLIFIER

Michael Reich, Stuttgart-Wangen, Germany, assignor to Eastman Kodak Company, Rochester, N.Y., a corporation of New Jersey Filed July 30, 1968, Ser. No. 748,795
Claims priority, application Germany, Dec. 1, 1967, 1,537,630
Int. Cl. G01j *1/44*
U.S. Cl. 356—226 2 Claims

ABSTRACT OF THE DISCLOSURE

A photoelectronic switching amplifier which controls a signal in a photographic camera equipped with a semi-automatic exposure control system in which the signal is visible in the viewfinder.

BACKGROUND OF THE INVENTION

In cameras having semi-automatic exposure control systems and viewfinder signals for indicating over or under-exposure, or having signals showing the optimum setting of the manually adjustable time and aperture combination, devices are known which incorporate electronic circuit arrangements and which are controlled by the illuminant dependent resistance of a CdS resistor. Each of said devices comprises a measuring amplifier whose output is fed to switching amplifiers. The number of semi-conductor components employed therein is considerable in order to provide the measuring accuracy and adaptability of the circuit to a variety of setting values; furthermore, a large number of semi-conductor components is needed to cope with the inevitable production tolerances of the CdS resistors. These known devices are too expensive for the aforementioned applications and do not answer current requirements.

SUMMARY OF THE INVENTION

The invention has as its object to find a cost-saving solution providing high switching accuracy and at the same time an operating range adjustable to almost infinitely small values thereby ensuring a positive indication of the optimum setting of time and aperture for the prevailing illumination of the subject.

The aforementioned requirements are met according to the invention by a circuit combination having the following features:

Two bridge circuits each having an NPN transistor in the shunt arm, and having two bridge arms in common comprising a fixed resistor and a CdS resistor, are connected in parallel. The emitter of one of said transistors is connected, together with the base of the other of said transistors, to the point where said two resistors are interconnected, the collectors of said two transistors being interconnected and said common point serving to control an emitter circuit biased in known manner by means of a diode and containing an incandescent lamp in the collector circuit of an NPN transistor.

A bridge arrangement of this type offers considerable advantages. The double bridge circuit with the two common branches, the CdS resistor and the fixed resistor, permits the use of two homopolar transistors of the NPN type. A saving in cost is realized by this arrangement.

By means of two potentiometers, the operating range of the measuring circuit, that is, the spacing of the switching points of the two transistors in the bridge shunt arms, can be reduced to as small a value as desired. This will determine the measuring accuracy obtainable so that the circuit arrangement can be adapted to whatever intended use is desired.

The two switching points can be varied so that the operating range can be shifted to any desired operating range. In this manner, the film speed selected, for example, can be taken into consideration.

Since the upper and lower switching points can be adjusted by means of the two potentiometers, the circuit can be balanced to nullify the difference in slope of the characteristic of the photoconductive cell due to production tolerances.

In the range between the two operating points, both transistors are cut off so that the bridge current is practically nil. As a result, the third transistor is biased positively so that when the transistors are cut off, it is turned on. The incandescent lamp connected into its collector circuit is then energized. At this point, a signal, for example, which could be a green lamp indicates in the viewfinder that the time and aperture combination selected for the subject illumination prevailing is at an optimum.

BRIEF DESCRIPTION OF THE DRAWING

The invention will be better understood when the following description is taken with the accompanying drawing in which:

The sole figure of the drawing shows a circuit diagram of an indicating arrangement according to the invention.

DESCRIPTION OF THE PREFERRED EMBODIMENT

Referring to the sole figure, a direct current source is connected between terminals 1 and 2. The positive pole is connected to terminal 1. Connected to two bridge circuits are a CdS resistor 3 and a bridge resistor 4, said two resistors being common to both bridge circuits. In the shunt arm of one of said bridge circuits having the bridge resistors 5 and 6, an NPN transistor 7 is connected with its base connected to the point between the resistors 3 and 4 and with its emitter to the point between the resistors 5 and 6. Correspondingly, the other of said bridges includes resistors 8 and 9 and the inversely connected second NPN transistor 10 in the shunt arm. The collectors of the two transistors 7 and 10 control jointly the third NPN transistor 11 which is connected in a grounded-emitter circuit. The base resistor 12 is connected between the positive pole 1 and the base transistor 11. Connected to the collector circuit of transistor 11 is the incandescent lamp 13 which serves to indicate the switching condition thereof. The emitter of transistor 11 is biased by means of the diode 14 to enforce a positive switching behavior thereof.

The two resistors 6 and 9 are of the potentiometer type; each of them permits the adjustment of an operating point of the two transistors 7 and 10, said operating points being located at different points on the resistance characteristic of the CdS resistor 3. The transistor 10 conducts when the resistance of the photoconductive cell 3 is below a selected value, that is, when said photoconductive cell is illuminated excessively. This indicates that the base current of the transistor 10 produced by the unbalancing of the bridge circuit flows with increased intensity via the collector through the resistor 12. As long as the consequent voltage drop across resistor 12 is high enough to prevent the base of the transistor 11 from being sufficiently positive relative to the emitter, which is biased by diode 14, the transistor 11 continues to block the flow of current. Thus, its collector current remains below the value that would cause the incandescent lamp 13 to be illuminated.

The transistor 11 and the incandescent lamp 13 show the same behavior when the photoconductive cell is too faintly illuminated, that is, when its resistance remains above a selected value. A bridge current then flows through the transistor 7 and its collector circuit via the resistor 12.

Between these two threshold values, however, the bridge is practically balanced; that is, its current is negligible. This means that both bridge transistors 7 and 10 are blocked and the base of the transistor 11 is connected to positive potential and conducts. The high collector current causes the incandescent lamp 13 to be brightly illuminated.

The switching behavior of transistor 11 eliminates any dubious flickering or slow lighting up of the incandescent lamp 13. The user of the camera obtains in the viewfinder a positive signal, no matter whether or not the light conditions prevailing enable a shot to be taken with the time and aperture combination selected. It is logical for said signal to be a green signal.

Although the photosensitive element has been described as a photoconductor, it is apparent to a person skilled in the art that any type of photocell could be used. It is further apparent that PNP transistors could be substituted for the NPN transitsors shown if the polarity of the battery was reversed. Furthermore, vacuum tubes or gas discharge tubes could be substituted for the transistors desired. Also the D.C. source need not be a battery such as shown but may be any source such as a D.C. generator or a charged capacitor. Additionally, the indicator has been shown as a lamp. However, it is apparent that any binary indicator could be used such as a solenoid which actuates a slide.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A photoelectric indicator circuit comprising:

(a) a photocell;

(b) a first resistor connected in series with said photocell;

(c) a pair of terminals for connecting a source of potential across said series combination of said resistor and said photocell;

(d) second and third resistors connected in series with each other and in parallel with the series combination of said photocell and first resistor;

(e) fourth and fifth resistors connected in series with each other and in parallel with the series combination of said photocell and first resistor;

(f) a first transistor having base, emitter and collector electrodes, the emitter of said first transistor being connected to the junction between the second and third resistors, and the base of said first transistor being connected to the junction between said first resistor and said photocell, said first transistor being rendered conductive when the voltage level at the junction between said first resistor and said photocell exceeds a first predetermined value;

(g) a second transistor having base, emitter and collector electrodes, the base of said second transistor being connected to the junction between said fourth and fifth resistors, the emitter of said second transistor being connected to the junction between said first resistor and said photocell, said second transistor being rendered conductive when the voltage level at the junction between said first resistor and said photocell is below a second predetermined value which is less than the first predetermined value;

(h) a third transistor having base, emitter and collector electrodes, the base of said third transistor being connected to the collector electrodes of both said first and second transistors; and (i) an indicator lamp connected in series with the emitter and collector electrodes of said third transistor, said series combination including said lamp being connected between said terminals so that the actuation of said lamp is controlled by said third transistor which is rendered conductive when either of said first or second transistors is rendered conductive.

2. A photoelectronic switching circuit according to claim 1 in which at least one of said resistors is variable.

References Cited

UNITED STATES PATENTS

| | | | |
|---|---|---|---|
| 3,418,479 | 12/1968 | Schmitt | 250—206 |
| 3,452,656 | 1/1969 | Ruhle et al. | 95—10 |

FOREIGN PATENTS

| | | | |
|---|---|---|---|
| 454,605 | 6/1968 | Switzerland | 356—226 |

RONALD L. WIBERT, Primary Examiner

T. MAJOR, Assistant Examiner

U.S. Cl. X.R.

95—10